US006996650B2

(12) United States Patent
Calvignac et al.

(10) Patent No.: US 6,996,650 B2
(45) Date of Patent: Feb. 7, 2006

(54) METHOD AND APPARATUS FOR IMPLEMENTING MULTIPLE CONFIGURABLE SUB-BUSSES OF A POINT-TO-POINT BUS

(75) Inventors: Jean Calvignac, Cary, NC (US); Marco Heddes, Cary, NC (US); Kerry Christopher Imming, Rochester, MN (US); Christopher Jon Johnson, Rochester, MN (US); Joseph Franklin Logan, Raleigh, NC (US); Tolga Ozguner, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 419 days.

(21) Appl. No.: 10/147,682

(22) Filed: May 16, 2002

(65) Prior Publication Data

US 2003/0217214 A1 Nov. 20, 2003

(51) Int. Cl.
*G06F 13/42* (2006.01)
*G06F 13/14* (2006.01)
*G06F 13/40* (2006.01)
(52) U.S. Cl. ..................... 710/305; 710/106; 710/307
(58) Field of Classification Search ................. 710/305, 710/307, 106; 364/488
See application file for complete search history.

(56) References Cited

U.S. PATENT DOCUMENTS 5,260,608 A * 11/1993 Marbot ....................... 327/261

| 5,268,937 | A | * | 12/1993 | Marbot | 375/377 |
| 5,412,783 | A | * | 5/1995 | Skokan | 710/105 |
| 5,414,830 | A | * | 5/1995 | Marbot | 710/71 |
| 5,625,563 | A | * | 4/1997 | Rostoker et al. | 716/2 |
| 6,031,473 | A | * | 2/2000 | Kubinec | 341/100 |
| 6,167,077 | A | * | 12/2000 | Ducaroir et al. | 375/219 |
| 6,288,656 | B1 | * | 9/2001 | Desai | 341/100 |
| 6,510,549 | B1 | * | 1/2003 | Okamura | 716/17 |
| 6,687,779 | B1 | * | 2/2004 | Sturm et al. | 710/305 |

OTHER PUBLICATIONS

U.S. Appl. No. 10/147,615, filed May 16, 2002, "Method and Apparatus for Implementing Chip-to-Chip Interconnect Bus Initialization".

* cited by examiner

*Primary Examiner*—Tim Vo
*Assistant Examiner*—Christine Daley
(74) *Attorney, Agent, or Firm*—Joan Pennington

(57) ABSTRACT

A method and apparatus are provided for implementing multiple configurable sub-busses of a point-to-point bus. Each of a plurality of bus interconnects include a transmit interface and a receive interface connected to the point-to-point bus. Each transmit interface includes a transmit buffer and a serializer coupled between the buffer and the point-to-point bus. The transmit buffer provides an asynchronous interface between a transmit source and the serializer. The serializer receives data and control signals from the transmit buffer at a first frequency and transmits data and control signals over the point-to-point bus at a higher second frequency. Transmit steering logic is coupled between the transmit source and each transmit buffer of the plurality of bus interconnects. Transmit steering logic directs data and control signals from transmit source to each selected one of the transmit buffers based upon a selected bus configuration.

20 Claims, 4 Drawing Sheets

FIG. 4

SPLIT-BUS CONFIGURATIONS 400

| WORDS 402 | MODE 404 | WORD 3..0 MASTER/SLAVE 406 | AVAIL/VALID 408 |
|---|---|---|---|
| 4 | 32-BIT | M / S / S / S | 3,X,X,X |
| 4 | 16-BIT X 2 | M / S / M / S | 3,X,1,X |
| 4 | 8-BIT X 4 | M / M / M / M | 3,2,1,0 |
| 4 | 16-BIT, 8-BIT X 2 | M / S / M / M | 3,X,1,0 |
| 4 | 8-BIT X 2, 16-BIT | M / M / M / S | 3,2,1,X |
| 2 | 16-BIT | M / S | -,-,1,X |
| 2 | 8-BIT X 2 | M / M | -,-,1,0 |
| 1 | 8-BIT | M | -,-,-,0 |

METHOD AND APPARATUS FOR IMPLEMENTING MULTIPLE CONFIGURABLE SUB-BUSSES OF A POINT-TO-POINT BUS

RELATED APPLICATION

A related U.S. patent application Ser. No. 10/147,615, entitled "METHOD AND APPARATUS FOR IMPLEMENTING CHIP-TO-CHIP INTERCONNECT BUS INITIALIZATION" by Kerry Christopher Imming, Christopher Jon Johnson, and Tolga Ozguner, and assigned to the present assignee, is being filed on the same day as the present patent application.

FIELD OF THE INVENTION

The present invention relates generally to the data processing field, and more particularly, relates to a method and apparatus for implementing multiple configurable sub-busses of a point-to-point bus.

DESCRIPTION OF THE RELATED ART

Point-to-point busses are used throughout the industry to communicate between separate chips. They provide advantages over shared buses in that point-to-point busses minimize the control overhead and are capable of running at higher speeds due to their lighter loading.

One major disadvantage of a point-to-point link, however, is that it is very difficult to connect additional chips without either adding more input/output (I/O) pins or switching to a shared bus protocol and dealing with the added complexity of arbitration, addressing, extra loading, and the like.

Another potential problem with any chip interconnection scheme is that of limited chip I/O. For high bandwidth, higher cost designs, a wide point to point interconnect might be appropriate. However, if one of those chips needs to connect to a lower cost, lower performance, I/O constrained chip, the wide interconnect would cause an unnecessary burden on the smaller chip, especially since the smaller chip does not need the extra performance.

A need exists for an effective mechanism for implementing multiple configurable sub-busses of a point-to-point bus.

SUMMARY OF THE INVENTION

A principal object of the present invention is to provide a method and apparatus for implementing multiple configurable sub-busses of a point-to-point bus. Other important objects of the present invention are to provide such method and apparatus for implementing multiple configurable sub-busses of a point-to-point bus substantially without negative effect; and that overcome many of the disadvantages of prior art arrangements.

In brief, a method and apparatus are provided for implementing multiple configurable sub-busses of a point-to-point bus. Each of a plurality of bus interconnects include a transmit interface and a receive interface connected to the point-to-point bus. Each transmit interface includes a transmit buffer and a serializer coupled between the buffer and the point-to-point bus. The transmit buffer provides an asynchronous interface between a transmit source and the serializer. The serializer receives data and control signals from the transmit buffer at a first frequency and transmits data and control signals over the point-to-point bus at a higher second frequency. Transmit steering logic is coupled between the transmit source and each transmit buffer of the plurality of bus interconnects. Transmit steering logic directs data and control signals from transmit source to each selected one of the transmit buffers based upon a selected bus configuration. Each receive interface includes a deserializer connected to the point-to-point bus and a receive buffer coupled between the deserializer and a receive destination. The receive buffer provides an asynchronous interface between the deserializer and the receive destination. The deserializer receives data and control signals from the point-to-point bus at the higher second frequency and applies data and control signals to the receive buffer at a third frequency of the receive destination. Receive steering logic coupled between the receive destination and the receive buffer of each of the plurality of bus interconnects directs data to the receive destination from each selected one of the receive buffers based upon the selected bus configuration.

BRIEF DESCRIPTION OF THE DRAWINGS

The present invention together with the above and other objects and advantages may best be understood from the following detailed description of the preferred embodiments of the invention illustrated in the drawings, wherein:

FIG. 4 is a diagram illustrating an exemplary split-bus configurations table in accordance with the preferred embodiment.

DETAILED DESCRIPTION OF THE PREFERRED EMBODIMENTS

In accordance with features of the preferred embodiment, a chip-to-chip bus or point-to-point unidirectional bus can be configured to run on any of multiple configurations including, for example, a 32-bit point-to-point unidirectional bus can be configured as a single 32-bit link, two or fewer independent 16-bit links, four or fewer independent 8-bit links, one 16-bit link and two or fewer 8-bit links.

Figure 1:
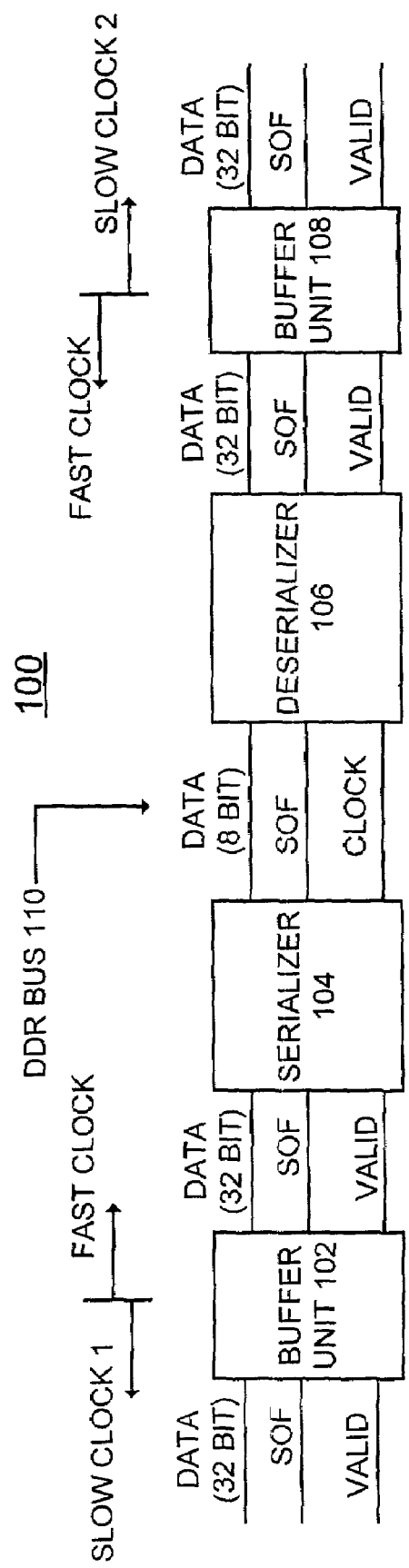
FIG. 1 is a block diagram representation illustrating an 8-bit bus mode with a single 8-bit bus in accordance with the preferred embodiment.

Having reference now to the drawings, in FIG. 1, there is shown an 8-bit bus mode generally designated by the reference character 100 with a single 8-bit bus 110 of the preferred embodiment. The single 8-bit bus 110 is a point-to-point, unidirectional bus. The 8-bit bus mode or chip-to-chip interconnect 100 is a building block for multiple chip-to-chip bus modes in accordance with the preferred embodiment.

The chip-to-chip interconnect 100 transports a packet of N bits generated by a source chip or transmitter (logical layer) to a destination chip or receiver. A transport layer and physical layer are defined by chip-to-chip interconnect 100 that transport the packets independent of the logical layer.

The transmit side of the chip-to-chip interconnect 100 includes a speed matching buffer 102 that provides an asynchronous interface between the logical layer indicated by SLOW CLOCK 1 of a source chip and a serializer 104 or the physical layer indicated by FAST CLOCK. Buffer unit 102 inputs and outputs 32 bits of data, a start-of-frame (SOF) signal, and a valid signal that are applied to the serializer 104. The serializer 104 transmits data received from the buffer 102 over the 8-bit off chip double data rate (DDR) bus 110 at a higher frequency.

The receiver side of the chip-to-chip interconnect 100 includes a deserializer 106 that receives the high frequency DDR data, SOF and clock and presents a speed matching buffer unit 108 with 32-bits of data at a lower frequency indicated by SLOW CLOCK 2 of the destination chip. The speed matching buffer 108 provides an asynchronous interface between the deserializer 106 and the logical layer. The buffer unit 102, serializer unit 104, and deserializer unit 106 all present a common interface (data, SOF, valid/avail).

Figure 2:
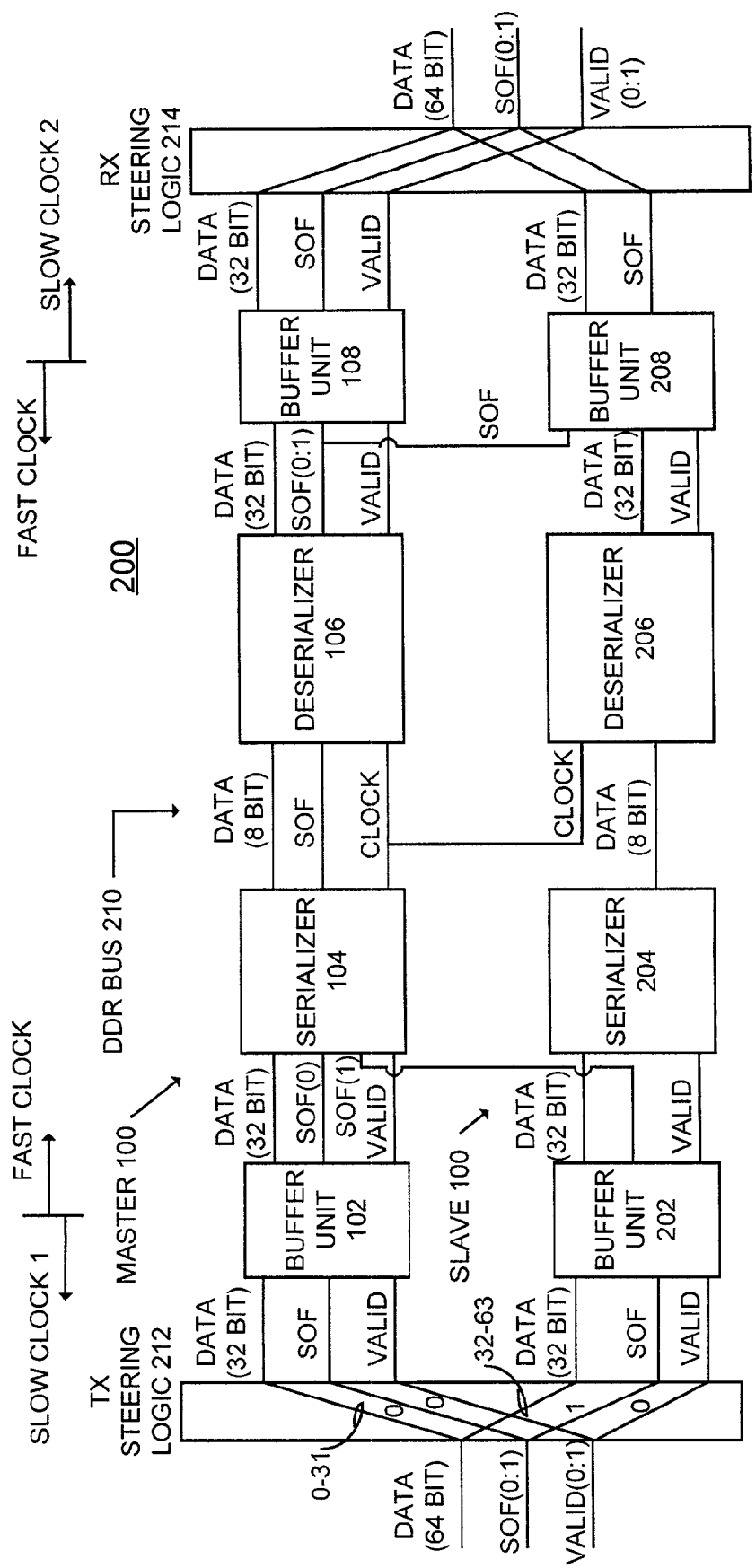
FIG. 2 is a block diagram representation illustrating a 16-bit bus mode with a single 16-bit bus including a pair of 8-bit buses in accordance with the preferred embodiment.

FIG. 2 illustrates a 16-bit bus mode generally designated by the reference character 200 with one 16-bit bus 210 formed by two instantiations of components of 8-bit bus mode or interconnect 100 together with transmit steering logic 212 and receive steering logic 214 in accordance with the preferred embodiment. The same reference characters as used in FIG. 1 are used in FIG. 2 for similar components of a master chip-to-chip interconnect.

As shown in FIG. 2, the upper 8-bit interconnect 100 is indicated as MASTER 100 and the lower 8-bit interconnect 100 is indicated as SLAVE 100. The MASTER interconnect 100 includes transmit buffer 102, serializer 104, deserializer 106 and receive buffer 108. The SLAVE interconnect 100 includes a transmit buffer 202, a serializer 204, a deserializer 206 and a receive speed matching buffer 208. In this master/slave mode, the clock and control information for the slave units are distributed from the master unit. The clock and control information for the slave deserializer 206 and slave buffer unit 208 are distributed from the master serializer 104 and master deserializer 106.

Transmit steering logic 212 directs appropriate data and start of frame (SOF) signals from the logical layer to the speed matching buffers 102, 202. As shown in FIG. 2, the SOF signal from the slave transmit buffer 202 is applied to the master serializer 104. The slave transmit buffer 202 provides 32-bit data and valid signal to the serializer 204. Serializers 104 and 204 transmit data respectively received from the buffers 102 and 202 over the two 8-bit or 16-bit off chip double data rate (DDR) bus 210 at a higher frequency. Receive steering logic 214 directs appropriate 32-bit data and start of frame (SOF) signals from the speed matching buffers 108, 208 to the 64-bit logical layer.

It should be understood that the 16-bit bus interface 200 with the 16-bit bus 210 can be implemented by two independent 8-bit bus interconnects 100. In this configuration, the upper and lower independent 8-bit bus interconnects 100 are configured as master interconnects 100, as illustrated in FIG. 1. The transmit steering logic 212 directing appropriate data and SOF signals to the buffers 102 from the transmit logical layer and receive steering logic 214 directing appropriate data and SOF signals from the speed matching buffers 108 to the receive logical layer for this bus configuration of 8-bit×2 bus mode.

Figure 3:
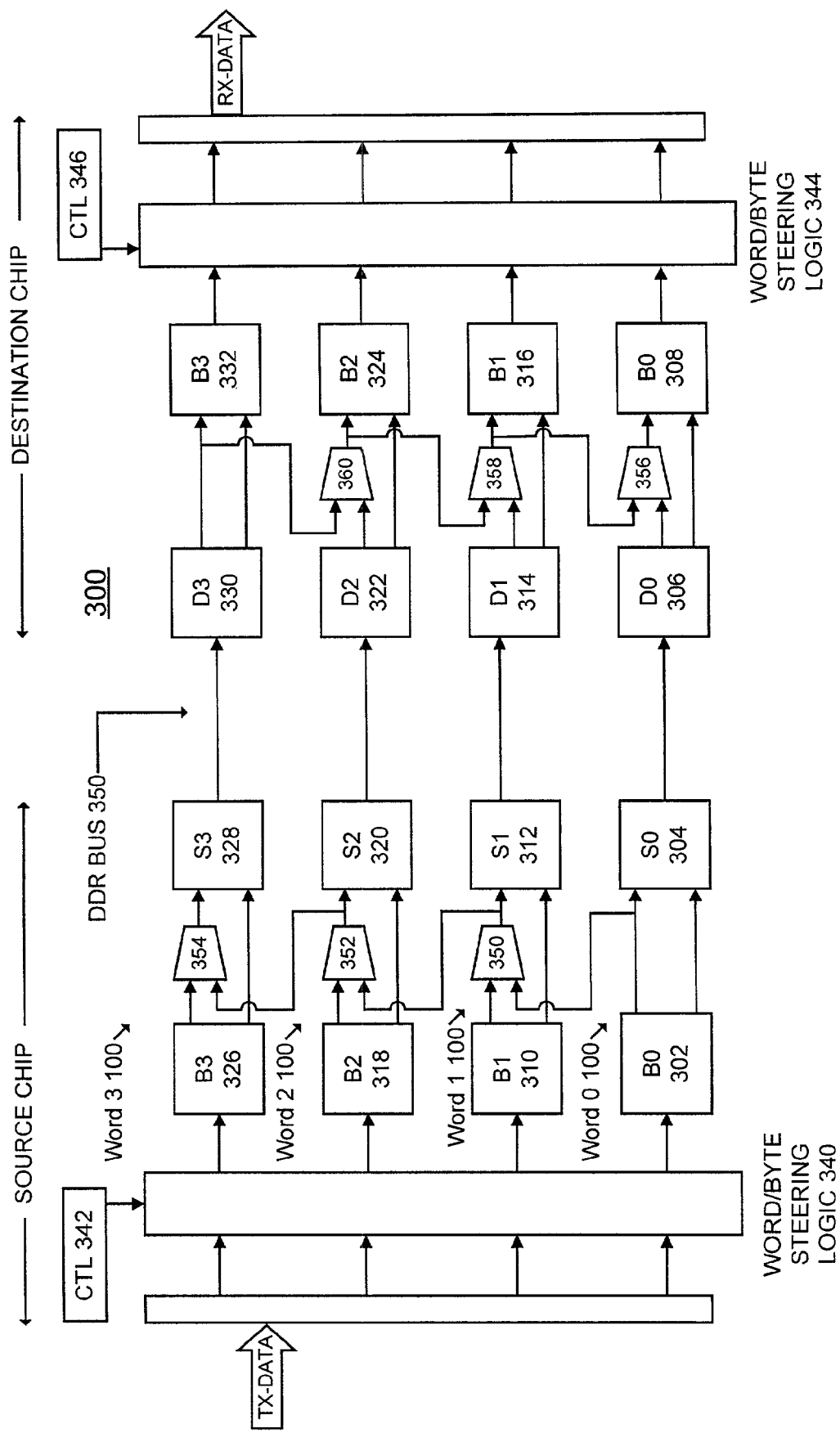
FIG. 3 is a block diagram representation illustrating a 32-bit bus selectively configured in various combinations of 32-bit, 16-bit or 8-bit busses in accordance with the preferred embodiment.

FIG. 3 illustrates a 32-bit bus interconnect of the preferred embodiment generally designated by the reference character 300 with one 32-bit bus 350 formed by four instantiations of components of 8-bit bus interconnects 100. The 32-bit bus 350 is selectively configured into various combinations of 32-bit, 16-bit or 8-bit busses in accordance with the preferred embodiment as illustrated and described with respect to FIG. 4.

The four instantiations of components of 8-bit bus interconnects 100 of the 32-bit bus interface 300 are generally designated as Word 0, Word 1, Word 2, and Word 3 interconnects 100. Word 0 includes a buffer B0 302, a serializer S0 304, a deserializer D0 306, and a buffer B0 308. Word 1 includes a buffer B1 310, a serializer S1 312, a deserializer D1 314, and a buffer B1 316. Word 2 includes a buffer B2 318, a serializer S2 320, a deserializer D2 322, and a buffer B2 324. Word 3 includes a buffer B3 326, a serializer S3 328, a deserializer D3 330, and a buffer B3 332.

Source chip transmit steering logic 340 operatively controlled by a control logic 342 directs appropriate data and start of frame (SOF) signals from the source logical layer to one or all of the speed matching buffers B0 302, B1 310, B2 318, B3 326 depending on a particular bus configuration. Destination chip receive steering logic 344 operatively controlled by a control logic 346 directs appropriate 32-bit data and start of frame (SOF) signals from one or all of the speed matching buffers B0 308, B1 316, B2 324, B3 332 to the destination logical layer depending on the particular bus configuration. For example, when implementing only 8-bit or 16-bit buses, only Word 0 including buffer B0 302, serializer S0 304, deserializer D0 306, and buffer B0 308 and Word 1 including buffer B1 310, serializer S1 312, deserializer D1 314, and buffer B1 316 are instantiated. For implementing only 8-bit, for example, only Word 0 including buffer B0 302, serializer S0 304, deserializer D0 306, and buffer B0 308 are instantiated.

Each instantiated source chip speed matching buffer B0 302, B1 310, B2 318, B3 326 provides an asynchronous interface between the source chip logical layer and respective serializer S0 304, S1 312, S2 320, S3 328. Each instantiated buffer unit B0 302, B1 310, B2 318, B3 326 inputs and outputs 32 bits of data applied to the respective serializer S0 304, S1 312, S2 320, S3 328. Each respective serializer S0 304, S1 312, S2 320, S3 328 transmits received data over the 8-bit off chip double data rate (DDR) bus 350 at a higher frequency. Each instantiated destination chip deserializer D0 306, D1 314, D2 322, D3 330 receives the high frequency DDR data and presents 32-bit data the respective destination buffer unit B0 308, B1 316, B2 324, B3 332. Each instantiated destination speed matching buffer B0 308, B1 316, B2 324, B3 332 provides an asynchronous interface between the respective deserializer D0 306, D1 314, D2 322, D3 330 and the logical layer. A plurality of two input source chip multiplexers 350, 352 and 354 receiving respective inputs from buffer unit B0 302, B1 310, B2 318, B3 326 provide flow control outputs to respective serializer S1 312, S2 320, S3 328. A plurality of two input destination chip multiplexers 356, 358 and 360 receiving respective inputs from respective deserializer D0 306, D1 314, D2 322, D3 330 provide flow control outputs to buffer unit B0 308, B1 316, B2 324. The select input to the source chip multiplexers 350, 352 and 354 and the destination chip multiplexers 356, 358 and 360 is based on master/slave configurations for the various multiple bus mode configurations as illustrated in FIG. 4.

The width of physical (DDR) bus 350 is programmable and can be 1, 2, or 4 8-bit words. That is, a macro with WORDS=1 represents an 8-bit chip-to-chip bus while a macro with WORDS=2 represents a 16-bit chip-to-chip bus and a macro with WORDS=4 represents a 32-bit chip-to-chip bus. Tx_data width is dictated by the physical bus width and is 32, 64, or 128 bits for WORDS=1, 2, and 4, respectively.

Split-bus mode further allows a single transmitter to connect to 2, 3 or 4 destination units by connecting to one-half or one-fourth of the data signals. The 32-bit chip-to-chip bus 350 can connect to up to four 8-bit buses. In this master/slave mode, the slave units are dataflow only and the clock and control information for the slave units are distributed from the master unit. In the 32-bit bus mode, the transmit and receive buffers operate in master/slave mode. The master (Word 3) works normally and handles the valid generation and flow control. The slave units (Word 0, Word 1, Word 2) are dataflow only when in the slave mode.

The logical layer is responsible for routing data correctly in the split-bus mode. Messages must be provided on the correct message data words. For example, in the 8-bit×4 mode, the logical layer must treat the data input to the chip-to-chip macro as four independent buses with each of the 8-bit bus interconnects 100, Word 0, Word 1, Word 2, Word 3 operated in the master mode.

FIG. 4 illustrates an exemplary valid split-bus configurations generally designated by the reference character 400 in accordance with the preferred embodiment as shown in the following table 1.

TABLE 1

| WORDS 402 | Mode 404 | Word 3..0 Master/Slave 406 | Avail/Valid 408 |
|---|---|---|---|
| 4 | 32-bit | M/S/S/S | 3,X,X,X |
| 4 | 16-bit X 2 | M/S/M/S | 3,X,1,X |
| 4 | 8-bit X 4 | M/M/M/M | 3,2,1,0 |
| 4 | 16-bit, 8-bit x 2 | M/S/M/M | 3,X,1,0 |
| 4 | 8-bit x 2, 16-bit | M/M/M/S | 3,2,1,X |
| 2 | 16-bit | M/S | —,—,1,X |
| 2 | 8-bit x 2 | M/M | —,—,1,0 |
| 1 | 8-bit | M | —,—,—,0 |

The WORDS 402 represents the programmable physical DDR bus width of 8-bit, 16-bit or 32-bit. The mode 404 represents the bus mode. The Word 3..0 master/slave mode 406 represents the master or slave operation of Word 3, Word 2, Word 1 and Word 0 of 32-bit bus interconnect 300. The Avail/Valid 408 indicates which tx_avail, rx_avail, tx_valid, rx_valid signals are valid for the various master/slave configurations. The X in Avail/Valid 408 indicates bits which are don't cares, and the—indicates bits which do not exist in that configuration.

For example, in the 16-bit×2 mode, the Word 3 and Word 1 are master units handling the valid generation and flow control and the Word 2 and Word 0 are slave units or dataflow only. For example, in the 16-bit×2 mode, serializers S2 320 and S0 304 respectively receive valid signal from respective master buffer B3 326 and B1 310. Similarly, deserializer D0 306 receives the same clock as deserializer D1 314 and speed matching buffer B0 308 receives the valid from deserializer D1 314.

While the present invention has been described with reference to the details of the embodiments of the invention shown in the drawing, these details are not intended to limit the scope of the invention as claimed in the appended claims.

What is claimed is:

1. Apparatus for implementing multiple configurable sub-busses of a point-to-point bus comprising:
   a plurality of bus interconnects, each bus interconnect including a transmit interface and a receive interface connected to said point-to-point bus;
   each said transmit interface including a transmit buffer and a serializer coupled between said transmit buffer and said point-to-point bus; said transmit buffer providing an asynchronous interface between a transmit source and said serializer; said serializer receiving data and control signals from said transmit buffer at a first frequency and transmitting data and control signals over said point-to-point bus at a higher frequency;
   transmit steering logic coupled between said transmit source and each said transmit buffer of said plurality of bus interconnects; said transmit steering logic directing data and control signals from said transmit source to each selected one of said transmit buffers based upon a selected bus configuration;
   first control logic coupled to said transmit steering logic for operatively controlling said transmit steering logic for said selected bus configuration;
   each said receive interface including a deserializer connected to said point-to-point bus and a receive buffer coupled between said deserializer and a receive destination; said receive buffer providing an asynchronous interface between said deserializer and said receive destination; said deserializer receiving data and control signals from said point-to-point bus at said higher second frequency and applying data and control signals to said receive buffer at a third frequency of said receive destination;
   receive steering logic coupled between said receive destination and said receive buffer of each of said plurality of bus interconnects directing data to said receive destination from each selected one of said receive buffers based upon said selected bus configuration; and
   second control logic coupled to said receive steering logic for operatively controlling said receive steering logic for said selected bus configuration.

2. Apparatus for implementing multiple configurable sub-busses of a point-to-point bus as recited in claim 1 wherein each of said plurality of bus interconnects is connected to a respective 8-bit sub-bus forming said point-to-point bus.

3. Apparatus for implementing multiple configurable sub-busses of a point-to-point bus as recited in claim 2 wherein said plurality of bus interconnects include four bus interconnects, each connected to said respective 8-bit sub-bus forming a 32-bit point-to-point bus.

4. Apparatus for implementing multiple configurable sub-busses of a point-to-point bus as recited in claim 3 wherein said point-to-point bus has a programmable bus width of one 8-bit word; two 8-bit words or four 8-bit words.

5. Apparatus for implementing multiple configurable sub-busses of a point-to-point bus as recited in claim 3 wherein said 32-bit point-to-point bus is configured as a single 32-bit link, two or fewer independent 16-bit links, four or fewer independent 8-bit links, one 16-bit link and two or fewer 8-bit links.

6. Apparatus for implementing multiple configurable sub-busses of a point-to-point bus as recited in claim 3 wherein said 32-bit point-to-point bus is configured as a single 32-bit link with one of said four bus interconnects operating as a master interconnect and three bus interconnect operating as slave interconnects; said master interconnect distributing clock and control information to said slave interconnects.

7. Apparatus for implementing multiple configurable sub-busses of a point-to-point bus as recited in claim 3 wherein said 32-bit point-to-point bus is configured as a single 16-bit link with two of said four bus interconnects instantiated; one instantiated bus interconnect operating as a master interconnect and one instantiated bus interconnect operating as a slave interconnect; said master interconnect distributing clock and control information to said slave interconnect.

8. Apparatus for implementing multiple configurable sub-busses of a point-to-point bus as recited in claim 3 wherein said 32-bit point-to-point bus is configured as a 16-bit×2 link with said four bus interconnects configured a first pair of bus interconnects and a second pair of bus interconnects; said first pair of bus interconnects and said second pair of said bus interconnects bus including one interconnect operating as a master interconnect and one bus interconnect operating as a slave interconnect; said master interconnect distributing clock and control information to said slave interconnect.

9. Apparatus for implementing multiple configurable sub-busses of a point-to-point bus as recited in claim 3 wherein said 32-bit point-to-point bus is configured as an 8-bit×4 link with each of said four bus interconnects operating as a master interconnect.

10. Apparatus for implementing multiple configurable sub-busses of a point-to-point bus as recited in claim 3 wherein said 32-bit point-to-point bus is configured as a 16-bit link and an 8-bit×2 link; said 16-bit link including a first pair of said bus interconnects including one interconnect operating as a master interconnect and one bus interconnect operating as a slave interconnect; said master interconnect distributing clock and control information to said slave interconnect; and said 8-bit×2 link including a second pair of said bus interconnects each operating as a master interconnect.

11. Apparatus for implementing multiple configurable sub-busses of a point-to-point bus as recited in claim 3 wherein said 32-bit point-to-point bus is configured as an 8-bit×2 link and a 16-bit link; said 8-bit×2 link including a first pair of said bus interconnects each operating as a master interconnect; and said 16-bit link including a second pair of said bus interconnects bus including one interconnect operating as a master interconnect and one bus interconnect operating as a slave interconnect; said master interconnect distributing clock and control information to said slave interconnect.

12. Apparatus for implementing multiple configurable sub-busses of a point-to-point bus as recited in claim 3 wherein said 32-bit point-to-point bus is configured as an 8-bit×2 link with two of said four bus interconnects instantiated and each instantiated bus interconnect operating as a master interconnect.

13. Apparatus for implementing multiple configurable sub-busses of a point-to-point bus as recited in claim 3 wherein said 32-bit point-to-point bus is configured as a single 8-bit link with one of said four bus interconnects instantiated and operating as a master interconnect.

14. A method for implementing multiple configurable sub-busses of a point-to-point bus comprising the steps of:
forming said point-to-point bus by a plurality of bus interconnects, each of said bus interconnects being connected to a respective 8-bit sub-bus;
providing a programmable bus width by instantiating selected ones of said plurality of bus interconnects;
selectively operating each said instantiated bus interconnect in one of a master interconnect mode or a slave interconnect mode to configure said point-to-point bus; and
providing steering logic coupled between a transmit source and said plurality of bus interconnects; said steering logic being operatively controlled by control logic based upon said selected interconnect mode for each said instantiated bus interconnect; and
directing data and control signals with said steering logic from said transmit source to selected ones of said instantiated bus interconnects.

15. A method for implementing multiple configurable sub-busses of a point-to-point bus as recited in claim 14 wherein the step of forming said point-to-point bus by said plurality of bus interconnects, each said bus interconnects being connected to a respective 8-bit sub-bus includes the step of forming a 32-bit point-to-point bus by four said bus interconnects.

16. A method for implementing multiple configurable sub-busses of a point-to-point bus as recited in claim 15 wherein the step of providing said programmable bus width by instantiating selected ones of said plurality of bus interconnects includes the steps of providing said programmable bus width of one, two or four 8-bit words by instantiating one, two or four of said four bus interconnects.

17. A method for implementing multiple configurable sub-busses of a point-to-point bus as recited in claim 16 wherein the step of selectively operating each said instantiated bus interconnect in one of said master interconnect mode or said slave interconnect mode to configure said point-to-point bus includes the steps of operating one instantiated bus interconnect in said master interconnect mode for a single 8-bit bus mode configuration.

18. A method for implementing multiple configurable sub-busses of a point-to-point bus as recited in claim 16 wherein the step of selectively operating each said instantiated bus interconnect in one of said master interconnect mode or said slave interconnect mode to configure said point-to-point bus includes the steps of operating one of two instantiated bus interconnects in said master interconnect mode and one in said slave interconnect mode for a single 16-bit bus mode configuration.

19. A method for implementing multiple configurable sub-busses of a point-to-point bus as recited in claim 16 wherein the step of selectively operating each said instantiated bus interconnect in one of said master interconnect mode or said slave interconnect mode to configure said point-to-point bus includes the steps of operating one of four instantiated bus interconnects in said master interconnect mode and three of said four instantiated bus interconnects in said slave interconnect mode for a single 32-bit bus mode configuration.

20. A method for implementing multiple configurable sub-busses of a point-to-point bus as recited in claim 16 wherein the step of selectively operating each said instantiated bus interconnect in one of said master interconnect mode or said slave interconnect mode to configure said point-to-point bus includes the steps of operating each of four instantiated bus interconnects in said master interconnect mode for a 8-bit×4 bus mode configuration.

* * * * *